(12) United States Patent
Sakamoto et al.

(10) Patent No.: US 12,341,160 B2
(45) Date of Patent: Jun. 24, 2025

(54) ALL-SOLID-STATE BATTERY AND METHOD FOR MANUFACTURING THE SAME

(71) Applicant: TOYOTA JIDOSHA KABUSHIKI KAISHA, Toyota (JP)

(72) Inventors: Ryuto Sakamoto, Okazaki (JP); Kazuhiro Suzuki, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 314 days.

(21) Appl. No.: 16/792,990

(22) Filed: Feb. 18, 2020

(65) Prior Publication Data

US 2020/0280102 A1   Sep. 3, 2020

(30) Foreign Application Priority Data

Mar. 1, 2019 (JP) .................................. 2019-037606

(51) Int. Cl.
*H01M 4/66* (2006.01)
*H01M 10/0585* (2010.01)

(52) U.S. Cl.
CPC ....... *H01M 10/0585* (2013.01); *H01M 4/663* (2013.01); *H01M 4/667* (2013.01)

(58) Field of Classification Search
CPC ...... H01M 4/139; H01M 4/663; H01M 4/667; H01M 10/04; H01M 10/0525; H01M 10/0562; H01M 10/0565; H01M 10/0585; H01M 2300/0065; Y02E 60/10; Y02P 70/50

See application file for complete search history.

(56) References Cited

U.S. PATENT DOCUMENTS

| 2006/0093922 | A1  | 5/2006  | Kim et al.      |           |
|--------------|-----|---------|-----------------|-----------|
| 2009/0047575 | A1* | 2/2009  | Abe ............ | H01M 4/661 |
|              |     |         |                 | 429/163   |
| 2010/0330410 | A1  | 12/2010 | Takahashi et al.|           |

(Continued)

FOREIGN PATENT DOCUMENTS

| CN | 104752774 A | 7/2015 |
| CN | 108400378 A | 8/2018 |

(Continued)

OTHER PUBLICATIONS

JP2012226862a, Hiroaki Hayashi, "Monopolar solid state battery, laminate solid state battery, and mobile entity", May 3, 2022, retrieved from https://worldwide.espacenet.com/ (Year: 2012).*

(Continued)

*Primary Examiner* — Matthew T Martin
*Assistant Examiner* — Jared Hansen
(74) *Attorney, Agent, or Firm* — Dickinson Wright, PLLC (57) ABSTRACT

An all-solid-state battery includes two or more stacked battery units stacked together and having a monopolar structure. The stacked battery unit includes a first current collector layer, a first active substance layer, a solid electrolyte layer, a second active substance layer, a second current collector layer, a second active substance layer, a solid electrolyte layer, a first active substance layer, and a first current collector layer, which are stacked in this order. The first current collector layer and the first active substance layer that are stacked adjacently are bonded together with an adhesive.

17 Claims, 5 Drawing Sheets

(56) References Cited

U.S. PATENT DOCUMENTS

| | | | | |
|---|---|---|---|---|
| 2014/0170468 A1* | 6/2014 | Sasaoka | ............ | H01M 10/052 |
| | | | | 429/153 |
| 2015/0188195 A1* | 7/2015 | Matsushita | ....... | H01M 10/0565 |
| | | | | 29/623.5 |
| 2016/0087249 A1 | 3/2016 | Asano et al. | | |
| 2017/0207440 A1 | 7/2017 | Hama et al. | | |
| 2017/0222254 A1* | 8/2017 | Sakamoto | ........... | H01M 4/1391 |
| 2018/0123196 A1 | 5/2018 | Hasegawa et al. | | |
| 2018/0219217 A1* | 8/2018 | Park | ..................... | H01M 4/133 |
| 2018/0226652 A1 | 8/2018 | Mori et al. | | |
| 2018/0316049 A1* | 11/2018 | Hasegawa | ......... | H01M 10/0525 |
| 2019/0252728 A1 | 8/2019 | Shimizu et al. | | |
| 2020/0044257 A1* | 2/2020 | Koo | ................... | H01M 4/0404 |

FOREIGN PATENT DOCUMENTS

| | | | |
|---|---|---|---|
| JP | 2004-253155 A | | 9/2004 |
| JP | 2007-250319 A | | 9/2007 |
| JP | 2008-186595 A | | 8/2008 |
| JP | 2010-238687 A | | 10/2010 |
| JP | 4563503 B2 | | 10/2010 |
| JP | 2012226862 A | * | 11/2012 |
| JP | 2014235990 A | * | 12/2014 |
| JP | 2015050153 A | * | 3/2015 |
| JP | 2015-125872 A | | 7/2015 |
| JP | 2017027654 A | | 2/2017 |
| JP | 2017130283 A | | 7/2017 |
| JP | 2017204377 A | | 11/2017 |
| JP | 2018073665 A | | 5/2018 |
| JP | 2018106984 A | | 7/2018 |
| JP | 2018129222 A | | 8/2018 |
| JP | 2018-174074 A | | 11/2018 |
| JP | 2018-195528 A | | 12/2018 |
| KR | 10-2006-0047039 A | | 5/2006 |
| KR | 10-2017-0135180 A | | 12/2017 |
| WO | 2013/137205 A1 | | 9/2013 |
| WO | 2018087970 A1 | | 5/2018 |
| WO | WO-2019020724 A1 | * | 1/2019 |

OTHER PUBLICATIONS

JP2014235990a, Miyake Hideaki; Tomura Seiji, "All solid state battery and method for manufacturing all solid state battery", May 3, 2022, retrieved from https://worldwide.espacenet.com/ (Year: 2014).*

WO2019020724A1 Kun, et al. "Method for producing electrodes for battery cells", machine English translation retrieved from https://worldwide.espacenet.com/ Date: Dec. 29, 2023 (Year: 2019).*

J2015050153a, Ishigaki, "Laminate for all-solid state battery", machine English translation retrieved from https://worldwide.espacenet.com/ Date: Feb. 26, 2025 (Year: 2015).*

J2017204377a, Kato, et al. "All-solid battery", machine English translation retrieved from https://worldwide.espacenet.com/ Date: Feb. 26, 2025 (Year: 2017).*

U.S. Appl. No. 16/786,473, filed Feb. 10, 2020.

Office Action issued to U.S. Appl. No. 16/786,473 on Jan. 10, 2022.

Notice of Allowance issued to U.S. Appl. No. 16/786,473 on May 3, 2022.

Corrected Notice of Allowability issued to U.S. Appl. No. 16/786,473 on May 19, 2022.

Notice of Allowance issued to U.S. Appl. No. 16/786,473 on Jan. 11, 2023.

Office Action issued to U.S. Appl. No. 16/786,473 on Jun. 20, 2022.

Takumi Tanaka, U.S. Appl. No. 16/786,473, Final Office Action dated Oct. 3, 2023.

Takumi Tanaka, U.S. Appl. No. 16/786,473, Office Action dated Jan. 11, 2024.

Takumi Tanaka et al., U.S. Appl. No. 16/786,473, Non-Final Office Action issued Jun. 3, 2024.

* cited by examiner

ALL-SOLID-STATE BATTERY AND METHOD FOR MANUFACTURING THE SAME

INCORPORATION BY REFERENCE

The disclosure of Japanese Patent Application No. 2019-037606 filed on Mar. 1, 2019 including the specification, drawings and abstract is incorporated herein by reference in its entirety.

BACKGROUND

1. Technical Field

The present disclosure relates to an all-solid-state battery and a method for manufacturing the all-solid-state battery.

2. Description of Related Art

In recent years, various solid-state batteries have been developed as power supplies for mobile devices, automobiles, and the like.

For example, Japanese Unexamined Patent Application Publication No. 2017-204377 (JP 2017-204377 A) discloses an all-solid-state battery in which two or more battery units are stacked. In each battery unit, at least a current collector of a first electrode, an active substance layer of the first electrode, a solid electrolyte layer, an active substance layer of a second electrode, a current collector of the second electrode, an active substance layer of the second electrode, a solid electrolyte layer, and an active substance layer of the first electrode are stacked in this order. The second electrode is a counter electrode for the first electrode. The all-solid-state battery includes an adhesive for bonding the current collector of the first electrode of the battery unit to another battery unit stacked adjacently on the current collector.

Japanese Unexamined Patent Application Publication No. 2018-073665 (JP 2018-073665 A) discloses a sulfide all-solid-state battery including at least one unit cell, at least one heat absorbing layer, and a battery case that houses the unit cell and the heat absorbing layer. The unit cell contains a sulfide solid electrolyte. The heat absorbing layer contains at least one kind of organic heat absorbing material selected from the group consisting of a sugar alcohol and a hydrocarbon. The heat absorbing layer does not contain an inorganic hydrate.

SUMMARY

In order that a battery reaction may proceed in the all-solid-state battery, it is necessary to bind the all-solid-state battery at a predetermined binding pressure. Researches conducted thus far reveal a problem in that the service capacity decreases unless the all-solid-state battery is bound at a high binding pressure of about 5 to 10 MPa.

If the all-solid-state battery is bound at a high binding pressure as described above, it is necessary to provide a large binding member that can apply a high binding pressure. Therefore, a problem arises in that the overall energy density of the all-solid-state battery decreases.

The present disclosure provides an all-solid-state battery and a method for manufacturing the all-solid-state battery, in which a decrease in a service capacity can be suppressed even if the all-solid-state battery is bound at a low binding pressure.

A first aspect of the present disclosure relates to an all-solid-state battery including two or more stacked battery units having a monopolar structure. Each of the stacked battery units includes a first current collector layer, a first active substance layer, a solid electrolyte layer, a second active substance layer, a second current collector layer, a second active substance layer, a solid electrolyte layer, a first active substance layer, and a first current collector layer, which are stacked in this order. The first current collector layer and the first active substance layer that are stacked adjacently are bonded together with an adhesive.

The all-solid-state battery may be bound at a binding pressure of 1.0 MPa or lower in a stacking direction of the stacked battery units.

Conductive carbon may be coated on one side of the first current collector layer or both sides of the first current collector layer.

In at least one of the two or more stacked battery units, a difference between a maximum value and a minimum value of a thickness of a stacked body excluding the first current collector layers from the stacked battery unit may be 10 µm or more.

A second aspect of the present disclosure relates to a method for manufacturing an all-solid-state battery including two or more stacked battery units having a monopolar structure. Each of the stacked battery units includes a first current collector layer, a first active substance layer, a solid electrolyte layer, a second active substance layer, a second current collector layer, a second active substance layer, a solid electrolyte layer, a first active substance layer, and a first current collector layer, which are stacked in this order.

The method includes:
(a) providing a stacked body excluding the first current collector layers from each of the stacked battery units;
(b) obtaining each of the stacked battery units by bonding the first current collector layers to respective end faces of the stacked body in its stacking direction with adhesives; and
(c) stacking the two or more stacked battery units together.

The method may further include binding the all-solid-state battery at a binding pressure of 1.0 MPa or lower in a stacking direction of the stacked battery units.

Conductive carbon may be coated on one side of the first current collector layer or both sides of the first current collector layer.

In at least one of the two or more stacked battery units, a difference between a maximum value and a minimum value of a thickness of the stacked body may be 10 µm or more.

In the all-solid-state battery and the method for manufacturing the all-solid-state battery according to the present disclosure, the decrease in the service capacity can be suppressed even if the all-solid-state battery is bound at a low binding pressure.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of the present disclosure is described below in detail with reference to the drawings. For convenience of description, the same or corresponding parts in the drawings are represented by the same reference symbols to omit redundant description. All constituent elements of the embodiment are not essential, and the constituent elements may be omitted in part. The following embodiment illustrated in the drawings is illustrative of the present disclosure, and is not intended to limit the present disclosure.

All-Solid-State Battery

An all-solid-state battery of the present disclosure includes two or more stacked battery units having a monopolar structure.

Each of the stacked battery units includes a first current collector layer, a first active substance layer, a solid electrolyte layer, a second active substance layer, a second current collector layer, a second active substance layer, a solid electrolyte layer, a first active substance layer, and a first current collector layer, which are stacked in this order.

The first current collector layer and the first active substance layer that are stacked adjacently are bonded together with an adhesive. The two or more stacked battery units are stacked together.

In the present disclosure, the "first current collector layer" and the "first active substance layer" mean counter electrodes for the "second current collector layer" and the "second active substance layer", respectively.

That is, if the "first current collector layer" and the "first active substance layer" are a "positive current collector layer" and a "positive active substance layer", the "second current collector layer" and the "second active substance layer" are a "negative current collector layer" and a "negative active substance layer". Similarly, if the "first current collector layer" and the "first active substance layer" are a "negative current collector layer" and a "negative active substance layer", the "second current collector layer" and the "second active substance layer" are a "positive current collector layer" and a "positive active substance layer".

Figure 1:
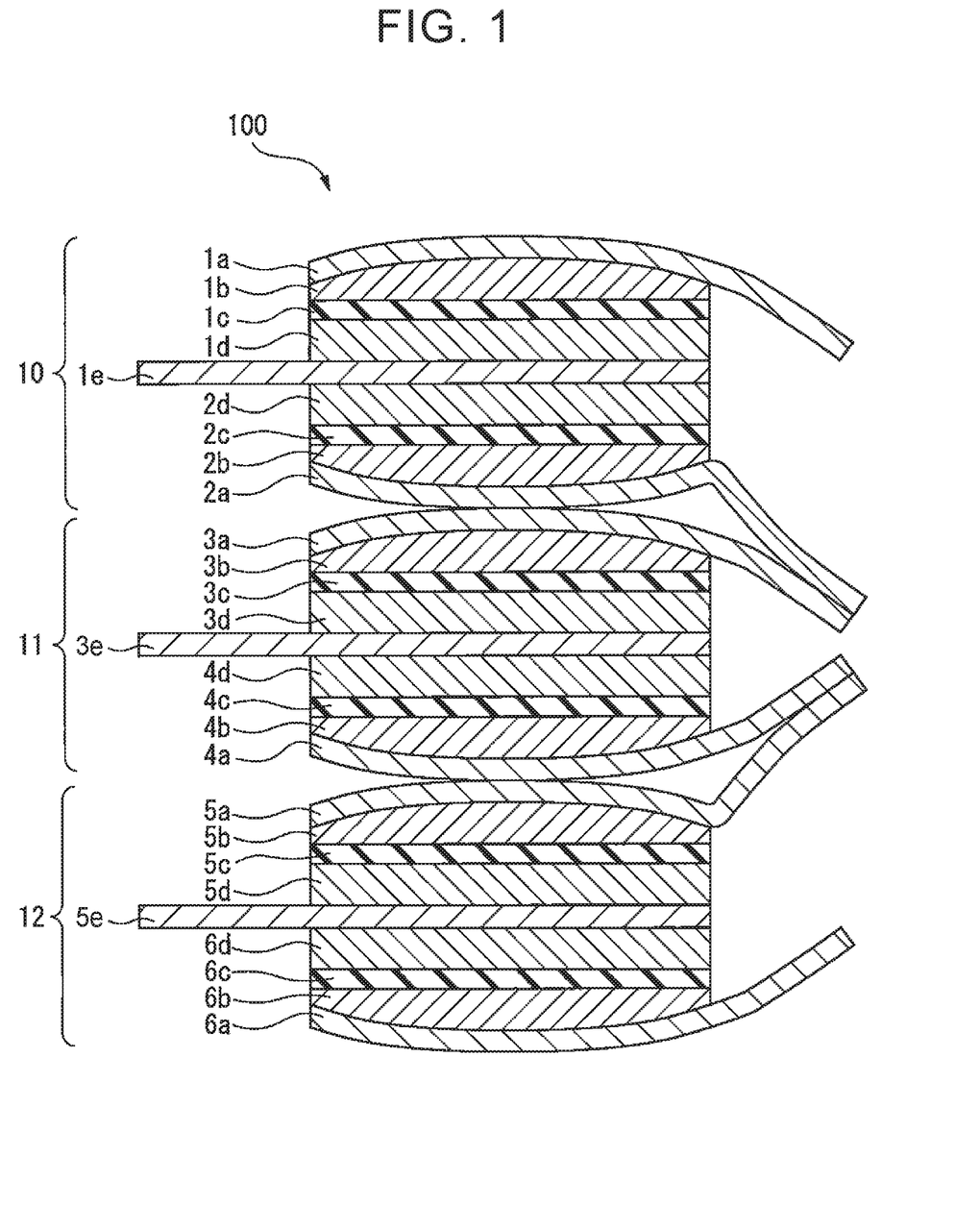
FIG. 1 is a schematic sectional view illustrating one form of an all-solid-state battery of the present disclosure.

FIG. 1 is a schematic sectional view illustrating one form of the all-solid-state battery of the present disclosure.

An all-solid-state battery 100 illustrated in FIG. 1 includes three stacked battery units 10, 11, and 12 stacked together and having a monopolar structure.

The stacked battery unit 10 includes a first current collector layer 1a, a first active substance layer 1b, a solid electrolyte layer 1c, a second active substance layer 1d, a second current collector layer 1e, a second active substance layer 2d, a solid electrolyte layer 2c, a first active substance layer 2b, and a first current collector layer 2a, which are stacked in this order.

Similarly to the stacked battery unit 10 described above, each of the stacked battery units 11 and 12 respectively includes current collector layers 3a, 3e, 4a, active substance layers 3b, 3d, 4d, 4b, and solid electrolyte layers 3c, 4c, which are stacked together and current collector layers 5a, 5e, 6a, active substance layers 5b, 5d, 6d, 6b, and solid electrolyte layers 5c, 6c, which are stacked together. Therefore, detailed description is omitted.

In the stacked battery unit according to the present disclosure, the first current collector layer and the first active substance layer that are stacked adjacently are bonded together with an adhesive.

For example, in FIG. 1, the first current collector layer 1a and the first active substance layer 1b that are stacked adjacently are bonded together with an adhesive. The first current collector layer 2a and the first active substance layer 2b that are stacked adjacently are bonded together with an adhesive. A first current collector layer 3a and a first active substance layer 3b that are stacked adjacently are bonded together with an adhesive. A first current collector layer 4a and a first active substance layer 4b that are stacked adjacently are bonded together with an adhesive. A first current collector layer 5a and a first active substance layer 5b that are stacked adjacently are bonded together with an adhesive. A first current collector layer 6a and a first active substance layer 6b that are stacked adjacently are bonded together with an adhesive.

In the all-solid-state battery of the present disclosure, a decrease in a service capacity can be suppressed even if the all-solid-state battery is bound at a low binding pressure.

The low binding pressure refers to a binding pressure lower than a normal pressure of 5 MPa. For example, the low binding pressure may be lower than 5.0 MPa, 4.5 MPa or lower, 4.0 MPa or lower, 3.5 MPa or lower, 3.0 MPa or lower, 2.5 MPa or lower, 2.0 MPa or lower, 1.5 MPa or lower, 1.0 MPa or lower, 0.9 MPa or lower, 0.8 MPa or lower, 0.7 MPa or lower, 0.6 MPa or lower, 0.5 MPa or lower, 0.4 MPa or lower, 0.3 MPa or lower, 0.2 MPa or lower, 0.1 MPa or lower, or 0.08 MPa or lower.

The lower limit value of the binding pressure is not particularly limited, but may be, for example, 0.05 MPa or higher or 0.08 MPa or higher.

The reason why the all-solid-state battery of the present disclosure can exert the effect described above may be mainly because (i) the first current collector layer and the first active substance layer that are stacked adjacently are bonded together with the adhesive, and (ii) two first current collector layers are stacked adjacently.

For example, in the all-solid-state battery 100 illustrated in FIG. 1, the first current collector layer 2a and the first active substance layer 2b that are stacked adjacently are bonded together with the adhesive. The first current collector layer 3a and the first active substance layer 3b that are stacked adjacently are bonded together with the adhesive. The first current collector layer 4a and the first active substance layer 4b that are stacked adjacently are bonded together with the adhesive. The first current collector layer 5a and the first active substance layer 5b that are stacked adjacently are bonded together with the adhesive. Further, the two first current collector layers 2a and 3a are stacked adjacently, and the two first current collector layers 4a and 5a are stacked adjacently.

Extensive researches conducted by the inventors of the present disclosure demonstrate that, even if the all-solid-state battery is bound at a low binding pressure, the two adjacently stacked first current collector layers can firmly be in contact with the first active substance layers that are stacked adjacent to the respective first current collector layers.

For example, even if the all-solid-state battery 100 illustrated in FIG. 1 is bound at a low binding pressure, the two adjacently stacked first current collector layers 2a and 3a can firmly be in contact with the first active substance layers 2b and 3b that are stacked adjacent to the respective first current collector layers 2a and 3a, and the two adjacently stacked first current collector layers 4a and 5a can firmly be in contact with the first active substance layers 4b and 5b that are stacked adjacent to the respective first current collector layers 4a and 5a.

In many related-art solid-state batteries (for example, the all-solid-state battery of Japanese Unexamined Patent Application Publication No. 2017-204377 (JP 2017-204377 A)), one first current collector layer is used alone between the stacked battery units while the other first current collector layer is omitted.

Figure 2:
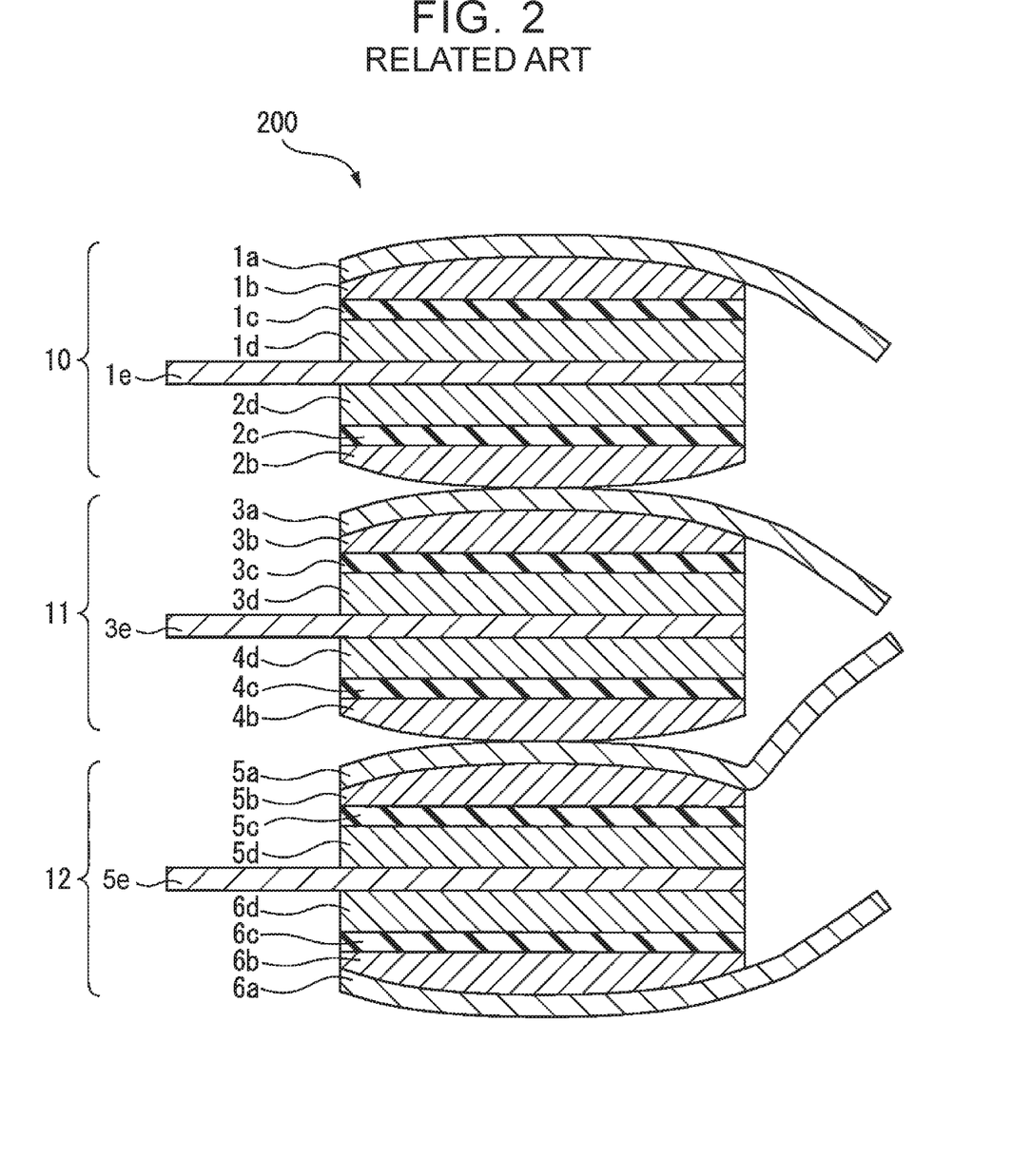
FIG. 2 is a schematic sectional view illustrating one form of a related-art all-solid-state battery.

FIG. 2 is a schematic sectional view illustrating one form of the related-art all-solid-state battery.

In an all-solid-state battery 200 illustrated in FIG. 2, one first current collector layer 3a is used alone between a stacked battery unit 10 and a stacked battery unit 11 while the other first current collector layer is omitted, and one first current collector layer 5a is used alone between the stacked battery unit 11 and a stacked battery unit 12 while the other first current collector layer is omitted.

In the related-art all-solid-state battery, the one first current collector layer is not sufficiently in contact with at least one of the first active substance layers that are stacked adjacently on respective sides of the one first current collector layer. Therefore, the service capacity may decrease. If the thickness of a stacked body excluding a current collector of a first electrode from a stacked battery unit is not uniform, or particularly if a difference between a maximum value and a minimum value of the thickness is relatively large, the contact failure may occur remarkably. The difference between the maximum value and the minimum value of the thickness may occur due to non-uniform application or roll pressing during manufacture of each layer.

For example, in the all-solid-state battery 200 illustrated in FIG. 2, the first current collector layer 3a is not sufficiently in contact with a first active substance layer 2b that is stacked adjacent to the first current collector layer 3a, or the first current collector layer 5a is not sufficiently in contact with a first active substance layer 4b that is stacked adjacent to the first current collector layer 5a. Therefore, the service capacity may decrease.

In the all-solid-state battery of the present disclosure, it is only necessary that the two adjacently stacked first current collector layers be in contact with each other at least in part. For example, in the all-solid-state battery 100 illustrated in FIG. 1, it is only necessary that the two adjacently stacked first current collector layers 2a and 3a be in contact with each other at least in part, and the two adjacently stacked first current collector layers 4a and 5a be in contact with each other at least in part.

Adhesive

The adhesive is not particularly limited, but may be a binder or a thermoplastic resin such as polyvinylidene difluoride (PVdF), carboxymethyl cellulose (CMC), butadiene rubber (BR), or styrene-butadiene rubber (SBR).

As the thermoplastic resin, a resin having a melting or softening point equal to or lower than deterioration temperatures of battery materials may be used suitably. Examples of the thermoplastic resin include a polyolefine resin. Specific examples include low-density polyethylene (LDPE) and an ethylene-vinyl acetate copolymer (EVA). The thermoplastic resin is not limited to those examples.

The method for applying the adhesive to the first current collector layer and the first active substance layer that are stacked adjacently is not particularly limited. The method may include applying the binder or the thermoplastic resin to the first current collector layer alone, the first active substance layer alone, or both the first current collector layer and the first active substance layer.

When the adhesive is applied, the viscosity is preferably low because the thickness of the adhesive can be reduced, and thus the thickness of the all-solid-state battery is not increased unnecessarily. Preferable examples of the adhesive include a binder having a viscosity of 1,800 mPa·s or less when the binder is applied, and a thermoplastic resin having a viscosity of 1,800 mPa·s or less when the thermoplastic resin is applied, because the thickness of the adhesive can be reduced to 5% or less of the electrode thickness of the all-solid-state battery.

The application amount of the adhesive is not particularly limited, but is preferably 0.1 μL/cm$^2$ or less with respect to the area of the first current collector layer or the first active substance layer because an increase in battery resistance can be suppressed. From the viewpoint of achieving a sufficient bonding strength, the application amount of the adhesive is preferably 0.02 μL/cm$^2$ or more or 0.05 μL/cm$^2$ or more.

Coating with Conductive Carbon

In the stacked battery unit of the present disclosure, one side of the first current collector layer or both sides of the first current collector layer may be coated with conductive carbon.

The conductive carbon has a higher flexibility than that of the material for the first current collector layer. By coating one side of the first current collector layer or both sides of the first current collector layer with the conductive carbon, the number of contact points between the first current collector layer and its adjacent layer can be increased. That is, the conductive carbon is preferable because of an effect that the resistance can be reduced at an interface between the first current collector layer and its adjacent layer, thereby contributing to improvement in the service capacity.

Figure 3:
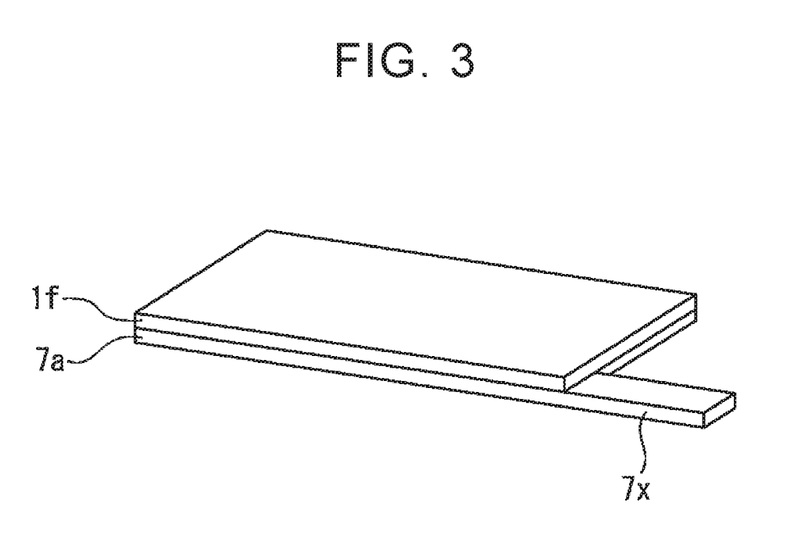
FIG. 3 is a perspective view illustrating one form in which one side of a first current collector layer is coated with conductive carbon.

FIG. 3 is a perspective view illustrating one form in which one side of the first current collector layer is coated with the conductive carbon.

As illustrated in FIG. 3, a first current collector layer 7a has a coating layer 1f of conductive carbon on its one side. In FIG. 3, the first current collector layer 7a has a current collector protrusion 7x that protrudes in a plane direction. The current collector protrusion 7x may be exposed without being coated with the conductive carbon.

If one side of the first current collector layer is coated with the conductive carbon, it is preferable that the surface of the first current collector layer that is coated with the conductive carbon in the stacked battery unit face the first active substance layer that is stacked adjacent to the first current collector layer.

The thickness of the coating film of the conductive carbon is not particularly limited. For example, the thickness may be 0.5 μm or more, 1.0 μm or more, 1.5 μm or more, or 2.0 μm or more, and may be 15.0 μm or less, 12.0 μm or less, 10.0 μm or less, 8.0 μm or less, 5.0 μm or less, 4.0 μm or less, or 3.0 μm or less.

The conductive carbon is not particularly limited. Examples of the conductive carbon include carbon black (typified by acetylene black, Ketjenblack, and furnace black), activated carbon, graphite, carbon fiber, and carbon nanotubes.

The conductive carbon may be mixed with a binder. The binder is not particularly limited. Examples of the binder include materials such as polyvinylidene difluoride (PVdF), carboxymethyl cellulose (CMC), butadiene rubber (BR), and styrene-butadiene rubber (SBR), and combinations of those materials.

Current Collector Tab

In the present disclosure, the stacked battery unit may have current collector tabs electrically connected to the first current collector layer and the second current collector layer, respectively. In this case, the current collector tabs may protrude from the faces of the stacked battery unit. According to this structure, electric power generated by the battery stacked body can be extracted to the outside via the current collector tabs.

Each of the first current collector layer and the second current collector layer may have a current collector protrusion that protrudes in a plane direction. For example, the first current collector layer 7a illustrated in FIG. 3 has the current collector protrusion 7x that protrudes in the plane direction.

Each current collector tab may electrically be connected to the protrusion.

Thickness

The thickness of the stacked battery unit is not particularly limited, and may be set as appropriate depending on purposes or applications of the all-solid-state battery. For example, the thickness of the stacked battery unit may be 200 µm or more, 250 µm or more, 300 µm or more, 350 µm or more, 400 µm or more, 450 µm or more, or 500 µm or more, and may be 1000 µm or less, 900 µm or less, 800 µm or less, 700 µm or less, or 600 µm or less.

In the present disclosure, the thickness may not be uniform in the plane direction in a stacked body excluding the first current collector layers from the stacked battery unit, that is, a stacked body including the first active substance layer, the solid electrolyte layer, the second active substance layer, the second current collector layer, the second active substance layer, the solid electrolyte layer, and the first active substance layer that are stacked in this order (hereinafter referred to simply as "stacked body" as well).

In the present disclosure, in at least one of the two or more stacked battery units, the difference between the maximum value and the minimum value of the thickness of the stacked body may be 1 µm or more, 5 µm or more, 10 µm or more, 15 µm or more, 20 µm or more, or 30 µm or more, and may be 100 µm or less, 80 µm or less, or 50 µm or less.

The proportion of the difference may be 0.15% or more, 0.25% or more, 0.50% or more, 1.0% or more, 2.0% or more, 3.0% or more, 4.0% or more, 5.0% or more, 6.0% or more, 7.0% or more, 7.5% or more, or 8.0% or more with respect to the maximum value of the thickness of the stacked body, and may be 10.0% or less, 9.0% or less, 8.5% or less, 8.0% or less, 7.5% or less, 7.0% or less, 6.0% or less, or 5.0% or less with respect to the maximum value of the thickness of the stacked body.

The "difference between the maximum value and the minimum value of the thickness of the stacked body" may be obtained based on a maximum value and a minimum value of the thickness that are measured by using a digital indicator or the like at a plurality of measurement points determined symmetrically and evenly on each end face of the stacked body in the stacking direction.

Figure 4:
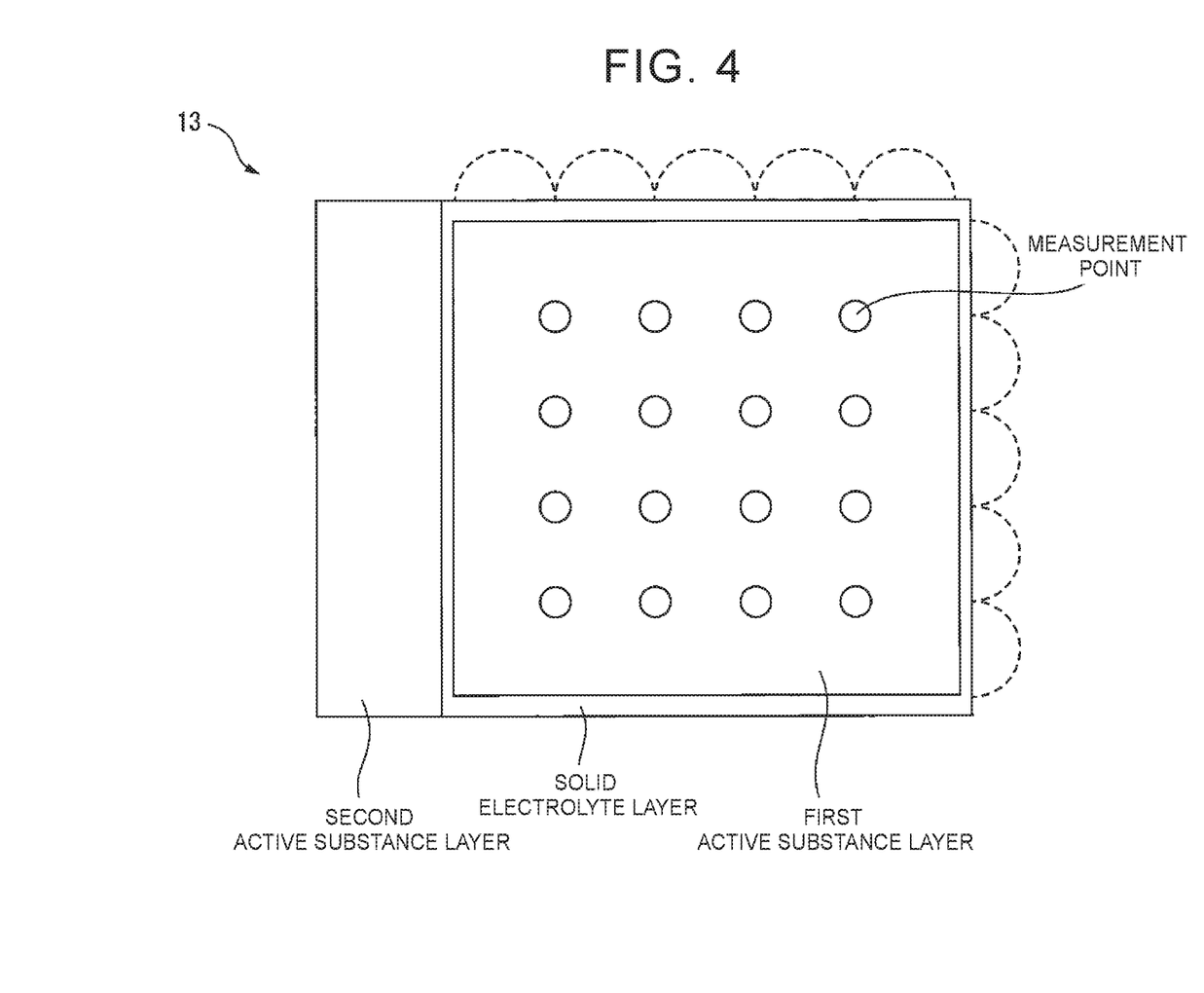
FIG. 4 is a schematic view illustrating measurement points for a difference between a maximum value and a minimum value of the thickness of a stacked body according to the present disclosure.

For example, FIG. 4 is a schematic view illustrating the measurement points for the difference between the maximum value and the minimum value of the thickness of the stacked body according to the present disclosure.

As illustrated in FIG. 4, a stacked body 13a is measured by using a digital indicator (manufactured by Teclock Co., Ltd.) at 16 measurement points determined symmetrically and evenly on each end face. A difference between a maximum value and a minimum value can be obtained as the "difference between the maximum value and the minimum value of the thickness of the stacked body".

Method for Manufacturing all-Solid-State Battery

The present disclosure further provides a method for manufacturing the all-solid-state battery.

The method of the present disclosure is a method for manufacturing an all-solid-state battery including two or more stacked battery units stacked together and having a monopolar structure.

Each of the stacked battery units includes a first current collector layer, a first active substance layer, a solid electrolyte layer, a second active substance layer, a second current collector layer, a second active substance layer, a solid electrolyte layer, a first active substance layer, and a first current collector layer, which are stacked in this order.

The method includes Steps (a) to (c):
(a) providing a stacked body excluding the first current collector layers from each of the stacked battery units;
(b) obtaining each of the stacked battery units by bonding the first current collector layers to respective end faces of the stacked body in its stacking direction with adhesives; and
(c) stacking the two or more stacked battery units together.

The method of the present disclosure is described below in detail with reference to FIG. 5. Redundant description is omitted for parts in common with the all-solid-state battery described above.

Step (a)

In Step (a), a stacked body excluding first current collector layers from a stacked battery unit is provided.

Figure 5:
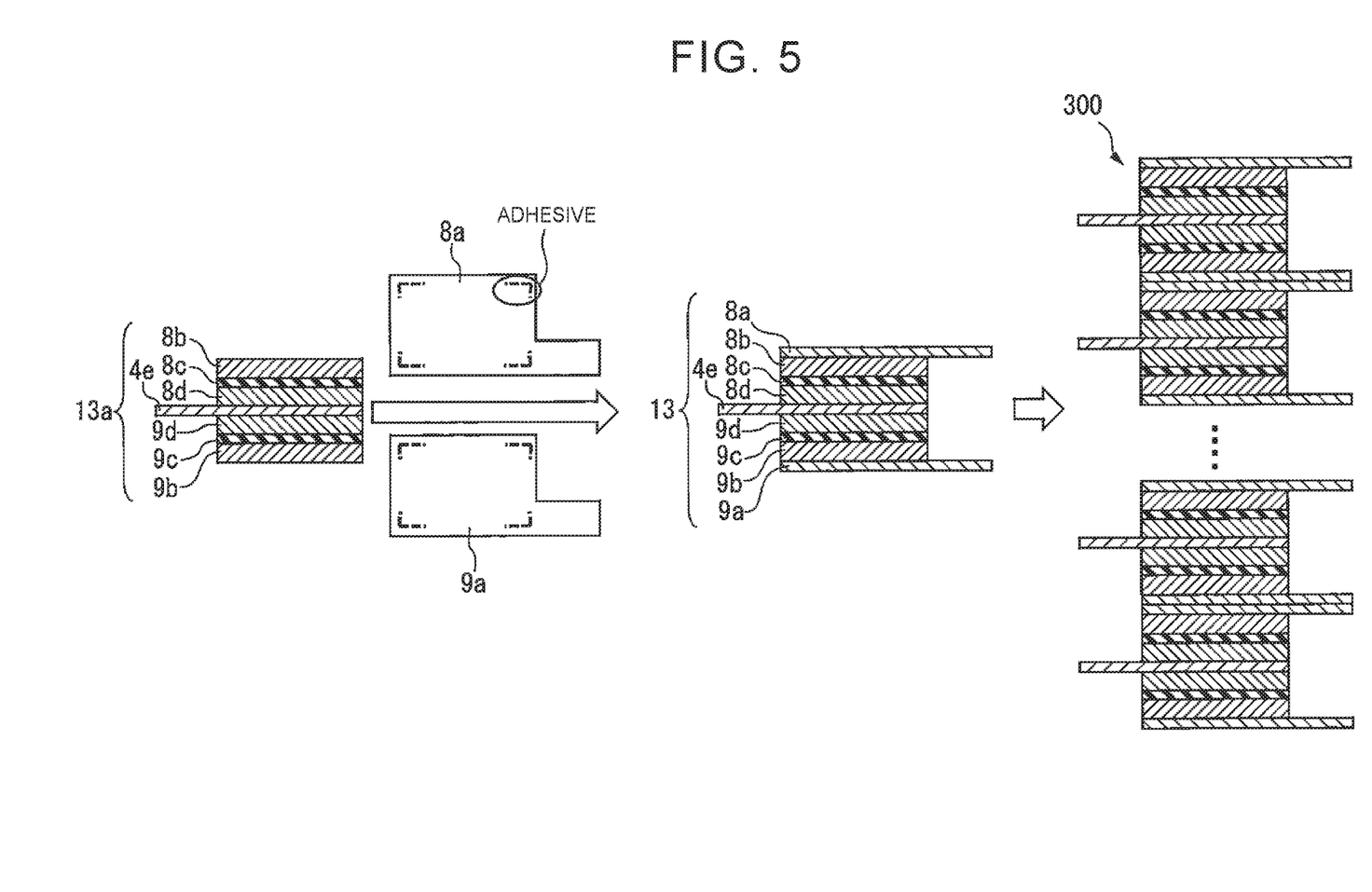
FIG. 5 is a schematic sectional view illustrating one form of steps included in a method of the present disclosure.

For example, a left part of FIG. 5 is a schematic sectional view illustrating how a stacked body 13a excluding first current collector layers from a stacked battery unit is provided.

As illustrated in the left part of FIG. 5, the stacked body 13a includes a first active substance layer 8b, a solid electrolyte layer 8c, a second active substance layer 8d, a second current collector layer 4e, a second active substance layer 9d, a solid electrolyte layer 9c, and a first active substance layer 9b, which are stacked in this order.

The method for providing the stacked body is not particularly limited. For example, the method may include: (a-1) forming the first active substance layers; (a-2) forming the second active substance layers on respective sides of the second current collector layer; (a-3) forming the solid electrolyte layers; (a-4) attaching and pressing the second active substance layers formed in Step (a-2) and the solid electrolyte layers formed in Step (a-3) so that the second active substance layers and the solid electrolyte layers are brought into direct contact with each other; and (a-5) attaching and pressing the first active substance layers formed in Step (a-1) and the solid electrolyte layers formed in Step (a-3) so that the first active substance layers and the solid electrolyte layers are brought into direct contact with each other. The order of Steps (a-1), (a-2), and (a-3) is not particularly limited.

Step (a-1)

Step (a-1) is a step of forming the first active substance layers. Details of Step (a-1) are not particularly limited as long as active substance layers for use in the all-solid-state battery can be formed.

For example, the first active substance layer can be formed by applying and drying, on a substrate, materials for the first active substance layer: a first active substance and a solid electrolyte, a conductive agent, and a binder that are used as necessary.

The substrate is not particularly limited. For example, the substrate may be a metal sheet or a resin film. Examples of the metal sheet include metal sheets made of aluminum, nickel, copper, stainless steel (SUS), and titanium. The metal sheet is not limited to those examples. Examples of the resin film include resin films made of polyethylene (PE), polyethylene terephthalate (PET), polybutylene terephthalate (PBT), polypropylene (PP), polyvinyl chloride (PVC), polystyrene (PS), syndiotactic polystyrene (SPS), poly methyl methacrylate (PMMA), an acrylonitrile-butadiene-styrene copolymer (ABS), a cycloolefin polymer (COP), polyamide (PA), polyimide (PI), polycarbonate (PC), and a fluororesin. The resin film is not limited to those examples.

The application is not particularly limited, and may be carried out by publicly-known methods or means. For example, there may be employed publicly-known application methods using a blade coater, a gravure coater, a dip coater, a reverse coater, a knife-over-roll coater, a wire bar coater, a slot die coater, an air knife coater, a curtain coater, and an extrusion coater, and combinations of those coaters.

To facilitate the application, the materials for the first active substance layer may be dispersed in a non-polar solvent such as heptane.

The drying is not particularly limited. For example, air drying and/or heat drying may be employed. The heat drying may be carried out by using a hot plate or hot air.

The first active substance layer formed on the substrate may be cut as appropriate depending on, for example, an intended size or shape of the all-solid-state battery.

Step (a-2)

Step (a-2) is a step of forming the second active substance layers. Details of Step (a-2) are not particularly limited as long as active substance layers for use in the all-solid-state battery can be formed.

For example, the second active substance layers can be formed by applying and drying, simultaneously on both sides of the second current collector layer or on each side at a time, materials for the second active substance layer: a second active substance and a solid electrolyte, a conductive agent, and a binder that are used as necessary.

Similarly to Step (a-1), the second active substance layers may be formed on respective sides of the second current collector layer such that the second active substance layers are formed on a substrate and then transferred onto respective sides of the second current collector layer.

Description of the application and drying is omitted because reference may be made to Step (a-1). To facilitate the application, the materials for the second active substance layer may be dispersed in a non-polar solvent such as heptane.

The second active substance layers formed on respective sides of the second current collector layer may be cut as appropriate depending on, for example, an intended size or shape of the all-solid-state battery.

Step (a-3)

Step (a-3) is a step of forming the solid electrolyte layers. Details of Step (a-3) are not particularly limited as long as solid electrolyte layers for use in the all-solid-state battery can be formed.

For example, the solid electrolyte layer can be formed by applying and drying, on a substrate, materials for the solid electrolyte layer: a solid electrolyte and a binder that is used as necessary.

Description of the type of the substrate and the application and drying is omitted because reference may be made to Step (a-1). To facilitate the application, the materials for the solid electrolyte layer may be dispersed in a non-polar solvent such as heptane.

The solid electrolyte layer formed on the substrate may be cut as appropriate depending on, for example, an intended size or shape of the all-solid-state battery.

Step (a-4)

Step (a-4) is a step of attaching and pressing the second active substance layers formed in Step (a-2) and the solid electrolyte layers formed in Step (a-3) so that the second active substance layers and the solid electrolyte layers are brought into direct contact with each other.

The pressing step is preferable from the viewpoint that the second active substance layers and the solid electrolyte layers can have compact structures. The pressing may be roll pressing.

The pressing pressure is not particularly limited. For example, the pressing pressure may be 0.5 t/cm or more, 1.0 t/cm or more, 1.5 t/cm or more, or 2.0 t/cm or more.

After the pressing, the substrates on the surfaces of the solid electrolyte layers are removed, and Step (a-5) may be carried out next.

Step (a-5)

Step (a-5) is a step of attaching and pressing the first active substance layers formed in Step (a-1) and the solid electrolyte layers formed in Step (a-3) so that the first active substance layers and the solid electrolyte layers are brought into direct contact with each other.

The pressing pressure is not particularly limited. Description of the pressing pressure is omitted because reference may be made to Step (a-4).

The stacked body can be provided by removing the substrates on the surfaces of the first active substance layers.

The obtained stacked body may be subjected to roll pressing in order to adjust the difference between the maximum value and the minimum value of the thickness of the stacked body. For example, the stacked body may be pressed at a pressure of 1.0 t/cm or more, 2.0 t/cm or more, 3.0 t/cm or more, 4.0 t/cm or more, or 5.0 t/cm or more.

Step (b)

In Step (b), a stacked battery unit is obtained by bonding first current collector layers to respective end faces of the stacked body in its stacking direction with adhesives.

For example, a central part of FIG. 5 is a schematic sectional view illustrating how a stacked battery unit 13 is obtained by bonding first current collector layers 8*a* and 9*a* to respective end faces of the stacked body 13*a* in its stacking direction with adhesives.

The position where the adhesive is applied is not particularly limited. For example, the adhesive may be applied in an L-shape at each corner of a portion of the first current collector layer 8*a* to be stacked as illustrated in FIG. 5.

As described above, one side of the first current collector layer or both sides of the first current collector layer may be coated with conductive carbon.

Therefore, the method of the present disclosure may further include Step (b-1): preparing the first current collector layers each coated with conductive carbon on one side or both sides prior to Step (b).

Step (b-1)

Step (b-1) is a step of coating one side of the first current collector layer or both sides of the first current collector layer with conductive carbon by applying and drying, on one side of the first current collector layer or both sides of the first current collector layer, a composition containing conductive carbon and a binder that is used as necessary.

Description of the application and drying is omitted because reference may be made to Step (a-1). To facilitate the coating, the composition containing the conductive carbon may be dispersed in an organic solvent such as N-methyl-2-pyrrolidone (NMP).

Commercially available first current collector layers each coated with conductive carbon on one side or both sides may be used in place of the first current collector layers obtained in Step (b-1).

Step (c)

In Step (c), two or more stacked battery units are stacked together.

For example, a right part of FIG. 5 is a schematic sectional view illustrating how the two or more stacked battery units are stacked together.

By the method of the present disclosure, it is possible to manufacture an all-solid-state battery 300 in which a decrease in a service capacity can be suppressed even if the all-solid-state battery 300 is bound at a low binding pressure.

The method of the present disclosure may further include binding the all-solid-state battery 300 at a low binding pressure in the stacking direction of the stacked battery units.

For example, the low binding pressure may be lower than 5.0 MPa, 4.5 MPa or lower, 4.0 MPa or lower, 3.5 MPa or lower, 3.0 MPa or lower, 2.5 MPa or lower, 2.0 MPa or lower, 1.5 MPa or lower, 1.0 MPa or lower, 0.9 MPa or lower, 0.8 MPa or lower, 0.7 MPa or lower, 0.6 MPa or lower, 0.5 MPa or lower, 0.4 MPa or lower, 0.3 MPa or lower, 0.2 MPa or lower, 0.1 MPa or lower, or 0.08 MPa or lower. The lower limit value of the binding pressure is not particularly limited, but may be, for example, 0.05 MPa or higher or 0.08 MPa or higher.

From the viewpoint that a binding jig can be made simple, downsized, and provided at low cost, it is preferable that the method of the present disclosure further include binding the all-solid-state battery 300 at a binding pressure of 1.0 MPa or lower in the stacking direction of the stacked battery units.

The binding at the low binding pressure may be carried out under atmospheric pressure or by using a small binding jig.

For example, the binding under the atmospheric pressure may be carried out by placing the stacked battery units in a film laminate and reducing the pressure in the film laminate as compared to the atmospheric pressure.

In the present disclosure, the all-solid-state battery 300 may be bound at a binding pressure higher than the binding pressure described above.

Members

Detailed description is given of members that may constitute the stacked battery unit according to the present disclosure and members for use in the steps in the method of the present disclosure.

To facilitate understanding of the present disclosure, description is given of exemplary members of a battery stacked body of a solid-state lithium ion secondary battery. The all-solid-state battery of the present disclosure is not limited to the lithium ion secondary battery, but may be applied widely.

Positive Current Collector Layer

The conductive material for use in the positive current collector layer is not particularly limited. Any conductive material that can be used for the all-solid-state battery may be employed as appropriate. Examples of the conductive material for use in the positive current collector layer include SUS, aluminum, copper, nickel, iron, titanium, and carbon. The conductive material is not limited to those examples. Of those materials, aluminum is preferable from the viewpoint of weight and cost.

The shape of the positive current collector layer is not particularly limited. Examples of the shape include a foil, a plate, and a mesh. Of those shapes, the foil is preferable.

Positive Active Substance Layer

The positive active substance layer contains at least a positive active substance. Preferably, the positive active substance layer further contains a solid electrolyte described later. In addition, the positive active substance layer may contain an additive for use in the positive active substance layer of the all-solid-state battery, such as a conductive agent or a binder, depending on purposes or applications of use.

The material for the positive active substance is not particularly limited. Examples of the positive active substance include lithium cobalt oxide ($LiCoO_2$), lithium nickel oxide ($LiNiO_2$), lithium manganese oxide ($LiMn_2O_4$), and Li—Mn spinels doped with different elements in compositions represented by $Li_{1.5}Co_{1/3}Ni_{1/3}Mn_{1/3}O_2$, $LiCo_{1/3}Ni_{1/3}Mn_{1/3}O_2$, and $Li_{1-x}Mn_{2-x-y}M_yO_4$ (M is one or more kinds of metallic element selected from among Al, Mg, Co, Fe, Ni, and Zn).

The conductive agent is not particularly limited. Examples of the conductive agent include metal agents and carbon agents such as vapor grown carbon fiber (VGCF) and carbon nanofiber.

The binder is not particularly limited. Examples of the binder include materials such as polyvinylidene difluoride (PVdF), carboxymethyl cellulose (CMC), butadiene rubber (BR), and styrene-butadiene rubber (SBR), and combinations of those materials.

Solid Electrolyte Layer

The solid electrolyte layer contains at least a solid electrolyte. The solid electrolyte is not particularly limited. Any material that can be used as the solid electrolyte of the all-solid-state battery may be used. Examples of the solid electrolyte include a sulfide solid electrolyte, an oxide solid electrolyte, and a polymer electrolyte.

Examples of the sulfide solid electrolyte include a sulfide-based amorphous solid electrolyte, a sulfide-based crystalline solid electrolyte, and an argyrodite solid electrolyte. The sulfide solid electrolyte is not limited to those examples. Specific examples of the sulfide solid electrolyte include $Li_2S$—$P_2S_5$-based electrolytes (such as $Li_7P_3S_{11}$, $Li_3PS_4$, and $Li_8P_2S_9$), $Li_2S$—$SiS_2$, $LiI$—$Li_2S$—$SiS_2$, $LiI$—$Li_2S$—$P_2S_5$, $LiI$—$LiBr$—$Li_2S$—$P_2S_5$, $Li_2S$—$P_2S_5$—$GeS_2$ (such as $Li_{10}GeP_3S_{16}$ and $Li_{10}GeP_2S_{12}$), $LiI$—$Li_2S$—$P_2O_5$, $LiI$—$Li_3PO_4$—$P_2S_5$, $Li_{7-x}PS_{6-x}Cl_x$, and combinations of those electrolytes. The sulfide solid electrolyte is not limited to those specific examples.

Examples of the oxide solid electrolyte include $Li_7La_3Zr_2O_{12}$, $Li_{7-x}La_3Zr_{1-x}Nb_xO_{12}$, $Li_{7-3x}La_3Zr_2Al_xO_{12}$, $Li_{3x}La_{2/3-x}TiO_3$, $Li_{1+x}Al_xTi_{2-x}(PO_4)_3$, $Li_{1+x}Al_xGe_{2-x}(PO_4)_3$, $Li_3PO_4$, and $Li_{3+x}PO_{4-x}N_x$ (LiPON). The oxide solid electrolyte is not limited to those examples.

Polymer Electrolyte

Examples of the polymer electrolyte include polyethylene oxide (PEO), polypropylene oxide (PPO), and copolymers of those oxides. The polymer electrolyte is not limited to those examples.

The solid electrolyte may be glass or crystallized glass (glass ceramic). The solid electrolyte layer may contain a binder or the like as necessary in addition to the solid electrolyte described above. As a specific example, the binder is similar to any "binder" enumerated in the section of "positive active substance layer". Therefore, its description is omitted.

Negative Active Substance Layer

The negative active substance layer contains at least a negative active substance. Preferably, the negative active substance layer further contains the solid electrolyte described above. In addition, the negative active substance layer may contain an additive for use in the negative active substance layer of the all-solid-state battery, such as a conductive agent or a binder, depending on purposes or applications of use.

The material for the negative active substance is not particularly limited. The material can preferably store and release metal ions such as lithium ions. Examples of the negative active substance include an oxide negative active substance, an alloy negative active substance, and a carbon material. The negative active substance is not limited to those examples.

The oxide negative active substance is not particularly limited. Examples of the oxide negative active substance include lithium titanate (LTO) particles.

The alloy negative active substance is not particularly limited. Examples of the alloy negative active substance include a Si alloy negative active substance and a Sn alloy negative active substance. Examples of the Si alloy negative active substance include silicon, silicon oxide, silicon carbide, silicon nitride, and their solid solutions. The Si alloy negative active substance may contain elements other than silicon, such as Fe, Co, Sb, Bi, Pb, Ni, Cu, Zn, Ge, In, Sn, or Ti. Examples of the Sn alloy negative active substance include tin, tin oxide, tin nitride, and their solid solutions. The Sn alloy negative active substance may contain elements other than tin, such as Fe, Co, Sb, Bi, Pb, Ni, Cu, Zn, Ge, In, Ti, or Si. Of those negative active substances, the Si alloy negative active substance is preferable.

The carbon material is not particularly limited. Examples of the carbon material include hard carbon, soft carbon, and graphite.

A solid electrolyte, a conductive agent, a binder, or other additives for use in the negative active substance layer may be any substances described in the sections of "positive active substance layer" and "solid electrolyte layer" as appropriate.

Negative Current Collector Layer

The conductive material for use in the negative current collector layer is not particularly limited. Any conductive material that can be used for the all-solid-state battery may be employed as appropriate. Examples of the conductive material for use in the negative current collector layer include SUS, aluminum, copper, nickel, iron, titanium, and carbon. The conductive material is not limited to those examples.

The shape of the negative current collector layer is not particularly limited. Examples of the shape include a foil, a plate, and a mesh. Of those shapes, the foil is preferable.

The present disclosure is described below in detail by way of examples. The following examples are not intended to limit the application of the present disclosure.

Example 1

Step (a): Providing a Stacked Body Excluding First Current Collector Layers from a Stacked Battery Unit In Example 1, the stacked body was manufactured such that the "first current collector layer" and the "first active substance layer" were a "positive current collector layer" and a "positive active substance layer" and the "second current collector layer" and the "second active substance layer" were a "negative current collector layer" and a "negative active substance layer".

Step (a-1)

Polyvinylidene difluoride (PVdF), positive active substance particles, a solid electrolyte ($Li_2S$—$P_2S_5$-based glass ceramic), and VGCF (produced by Showa Denko K. K) were added into a container made of polypropylene, and were stirred for 30 seconds by using an ultrasonic dispersion apparatus (manufactured by SMT Co., Ltd.: UH-50). Next, the container was shaken for 3 minutes by using a shaker (manufactured by Sibata Scientific Technology Ltd.: TTM-1), and the materials were further stirred for 30 seconds by using the ultrasonic dispersion apparatus. Then, the container was further shaken for 3 minutes by using the shaker, and the obtained materials for a positive active substance layer were applied onto an aluminum foil by a blade method using an applicator. The applied materials for a positive active substance layer were subjected to air drying, and then dried for 30 minutes on a hot plate at 100° C. Thus, a positive active substance layer was formed on the aluminum foil.

The positive active substance particles were positive active substance particles (particles having $Li_{1.5}Co_{1/3}Ni_{1/3}Mn_{1/3}O_2$ as a main phase) having lithium niobate coating layers obtained such that the positive active substance particles were coated with lithium niobate under the atmosphere by using a tumbling fluidized bed coater (manufactured by Powrex Corporation) and baked under the atmosphere.

Step (a-2)

PVdF, negative active substance particles (LTO particles), and a solid electrolyte ($Li_2S$—$P_2S_5$-based glass ceramic) were added into a container made of polypropylene, and were stirred for 30 seconds by using an ultrasonic dispersion apparatus (manufactured by SMT Co., Ltd.: UH-50). The obtained materials for a negative active substance layer were applied onto both sides of a copper foil by the doctor blade method using an applicator. The applied materials for a negative active substance layer were subjected to air drying, and then dried for 30 minutes on a hot plate at 100° C. Thus, negative active substance layers were formed on respective sides of the copper foil.

Step (a-3)

Heptane, butadiene rubber (BR), and a solid electrolyte ($Li_2S$—$P_2S_5$-based glass ceramic) were added into a container made of polypropylene, and were stirred for 30 seconds by using an ultrasonic dispersion apparatus (manufactured by SMT Co., Ltd.: UH-50). Next, the container was shaken for 3 minutes by using a shaker (manufactured by Sibata Scientific Technology Ltd.: TTM-1), and the materials were further stirred for 30 seconds by using the ultrasonic dispersion apparatus. Then, the container was further shaken for 3 minutes by using the shaker, and the obtained materials for a solid electrolyte layer were applied onto an aluminum foil by a blade method using an applicator. The applied materials for a solid electrolyte layer were subjected to air drying, and then dried for 30 minutes on a hot plate at 100° C. Thus, a solid electrolyte layer was formed on the aluminum foil.

Step (a-4)

The negative active substance layers formed in Step (a-2) were cut into areas of 7.2 $cm^2$×7.2 $cm^2$. Similarly, the solid electrolyte layer formed in Step (a-3) was cut into areas of 7.2 $cm^2$×7.2 $cm^2$. Then, the negative active substance layers and the solid electrolyte layers were attached and pressed at 1.6 t/cm so that the negative active substance layers and the solid electrolyte layers were brought into direct contact with each other, thereby obtaining a stacked body having a structure of "aluminum foil-solid electrolyte layer-negative active substance layer-copper foil (negative current collector layer)-negative active substance layer-solid electrolyte layer-aluminum foil".

Step (a-5)

The positive active substance layer formed in Step (a-1) was cut into areas of 7.0 cm²×7.0 cm². The aluminum foils were removed from the obtained stacked body having the structure of "aluminum foil-solid electrolyte layer-negative active substance layer-copper foil (negative current collector layer)-negative active substance layer-solid electrolyte layer-aluminum foil". Then, the positive active substance layers and the solid electrolyte layers were attached and pressed at 1.6 t/cm so that the positive active substance layers and the solid electrolyte layers were brought into direct contact with each other, thereby obtaining a stacked body having a structure of "aluminum foil-positive active substance layer-solid electrolyte layer-negative active substance layer-copper foil (negative current collector layer)-negative active substance layer-solid electrolyte layer-positive active substance layer-aluminum foil".

Then, the aluminum foils were removed, and the stacked body was pressed at 5.0 t/cm, thereby obtaining a stacked body having a structure of "positive active substance layer-solid electrolyte layer-negative active substance layer-copper foil (negative current collector layer)-negative active substance layer-solid electrolyte layer-positive active substance layer".

The obtained stacked body was subjected to roll pressing to adjust a difference between a maximum value and a minimum value of the thickness to 1 µm.

Similarly to FIG. 4, the difference between the maximum value and the minimum value of the thickness of the stacked body was obtained by measuring the stacked body with a digital indicator (manufactured by Teclock Co., Ltd.) at 16 measurement points determined symmetrically and evenly on each end face.

The maximum value of the thickness of the obtained stacked body was 400 µm. Thus, the difference between the maximum value and the minimum value of the thickness of the stacked body was 0.25% with respect to the maximum value of the thickness of the stacked body (100%).

Step (b): Obtaining a Stacked Battery Unit by Bonding First Current Collector Layers to Respective End Faces of the Stacked Body in its Stacking Direction with Adhesives Step (b-1)

As conductive carbon, furnace black and polyvinylidene difluoride (PVdF) were weighed at a volume ratio of 25:72 (furnace black to PVdF). Next, N-methyl-2-pyrrolidone (NMP) was added, and a composition containing the conductive carbon was prepared.

The prepared composition containing the conductive carbon was applied to one side of an aluminum foil at a thickness of 2.0 µm, and was dried for 1 hour at 100° C. Thus, an aluminum foil coated with the conductive carbon on one side was prepared as each positive current collector layer (first current collector layer).

By using butadiene rubber (BR), the positive current collector layers obtained as described above were attached to respective sides of the stacked body obtained in Step (a), thereby obtaining a stacked battery unit of Example 1. At this time, each positive current collector layer was attached so that the surface coated with the conductive carbon faced the end face of the stacked body (that is, the surface of the positive active substance layer).

Step (c): Stacking Two or More Stacked Battery Units Together

Twenty stacked battery units obtained in Step (b) were stacked together, and current collector tabs were welded. Then, the stacked battery units were enclosed in a film laminate at −0.08 MPa as compared to the atmospheric pressure, thereby manufacturing an all-solid-state battery of Example 1. In the manufactured all-solid-state battery of Example 1, the binding pressure of the binding under the atmospheric pressure via the film laminate was 0.08 MPa.

Example 2

An all-solid-state battery of Example 2 was manufactured similarly to Example 1 except that the difference between the maximum value and the minimum value of the thickness of the stacked body obtained in Step (a-5) ("positive active substance layer-solid electrolyte layer-negative active substance layer-copper foil (negative current collector layer)-negative active substance layer-solid electrolyte layer-positive active substance layer") was adjusted to 15 µm.

Example 3

An all-solid-state battery of Example 3 was manufactured similarly to Example 1 except that the difference between the maximum value and the minimum value of the thickness of the stacked body obtained in Step (a-5) ("positive active substance layer-solid electrolyte layer-negative active substance layer-copper foil (negative current collector layer)-negative active substance layer-solid electrolyte layer-positive active substance layer") was adjusted to 30 µm.

Example 4

An all-solid-state battery of Example 4 was manufactured similarly to Example 1 except that, in Step (b-1), an aluminum foil that was not coated with conductive carbon was used as each positive current collector layer in place of the aluminum foil coated with the conductive carbon on one side.

Example 5

An all-solid-state battery of Example 5 was manufactured similarly to Example 2 except that, in Step (b-1), an aluminum foil that was not coated with conductive carbon was used as each positive current collector layer in place of the aluminum foil coated with the conductive carbon on one side.

Example 6

An all-solid-state battery of Example 6 was manufactured similarly to Example 3 except that, in Step (b-1), an aluminum foil that was not coated with conductive carbon was used as each positive current collector layer in place of the aluminum foil coated with the conductive carbon on one side.

Comparative Example 1

An all-solid-state battery of Comparative Example 1 was manufactured similarly to Example 1 except that, in Step (b-1), the positive current collector layer was attached to the stacked body so that one positive current collector layer was provided between the stacked bodies.

Comparative Example 2

An all-solid-state battery of Comparative Example 2 was manufactured similarly to Example 2 except that, in Step (b-1), the positive current collector layer was attached to the stacked body so that one positive current collector layer was provided between the stacked bodies.

Comparative Example 3

An all-solid-state battery of Comparative Example 3 was manufactured similarly to Example 3 except that, in Step (b-1), the positive current collector layer was attached to the stacked body so that one positive current collector layer was provided between the stacked bodies.

Comparative Example 4

An all-solid-state battery of Comparative Example 4 was manufactured similarly to Example 4 except that, in Step (b-1), the positive current collector layer was attached to the stacked body so that one positive current collector layer was provided between the stacked bodies.

Comparative Example 5

An all-solid-state battery of Comparative Example 5 was manufactured similarly to Example 5 except that, in Step (b-1), the positive current collector layer was attached to the stacked body so that one positive current collector layer was provided between the stacked bodies.

Comparative Example 6

An all-solid-state battery of Comparative Example 6 was manufactured similarly to Example 6 except that, in Step (b-1), the positive current collector layer was attached to the stacked body so that one positive current collector layer was provided between the stacked bodies.

Evaluation

The manufactured solid-state batteries of the examples and the comparative examples were subjected to constant current, constant voltage (CC-CV) charging and then CC-CV discharging within a range of 1.6 V to 2.7 V with 0.33C at 25° C. Then, the service capacities were measured. Results are shown in Table 1.

The service capacities were measured similarly to the above while the manufactured solid-state batteries of the examples and the comparative examples were bound with a binding force of 5 MPa. Results are shown in Table 1.

The service capacities were measured similarly to the above while the manufactured solid-state batteries of the examples and the comparative examples were bound with a binding force of 10 MPa. Results are shown in Table 1.

TABLE 1

|  | Number of first current collector layers between stacked bodies | Difference between maximum value and minimum value of thickness of stacked body (proportion (%)) *1 | Coating of first current collector layer with conductive carbon | Comparison of service capacities *2 | | |
|---|---|---|---|---|---|---|
|  |  |  |  | Binding under atmospheric pressure *3 | Binding at 5 MPa | Binding at 10 MPa |
| Example 1 | 2 | 1 μm (0.25%) | Yes | 100 | 100 | 100 |
| Example 2 | 2 | 15 μm (3.75%) | Yes | 100 | 100 | 100 |
| Example 3 | 2 | 30 μm (7.5%) | Yes | 100 | 100 | 100 |
| Example 4 | 2 | 1 μm (0.25%) | No | 100 | 100 | 100 |
| Example 5 | 2 | 15 μm (3.75%) | No | 99 | 100 | 100 |
| Example 6 | 2 | 30 μm (7.5%) | No | 98 | 100 | 100 |
| Comparative Example 1 | 1 | 1 μm (0.25%) | Yes | 95 | 100 | 100 |
| Comparative Example 2 | 1 | 15 μm (3.75%) | Yes | 75 | 100 | 100 |
| Comparative Example 3 | 1 | 30 μm (7.5%) | Yes | 64 | 95 | 100 |
| Comparative Example 4 | 1 | 1 μm (0.25%) | No | 89 | 100 | 100 |
| Comparative Example 5 | 1 | 15 μm (3.75%) | No | 71 | 100 | 100 |
| Comparative Example 6 | 1 | 30 μm (7.5%) | No | 60 | 92 | 100 |

(proportion (%)) *1 Parenthesized values are proportions of the difference between the maximum value and the minimum value of the thickness of the stacked body with respect to the maximum value of the thickness of the stacked body.
Comparison of service capacities *2 Service capacities were compared with the results of Example 1 as "100".
Binding under atmospheric pressure *3 The stacked battery units were enclosed at −0.08 MPa as compared to the atmospheric pressure, hence the binding pressure was 0.08 MPa.

As understood from Table 1, if the difference between the maximum value and the minimum value of the thickness of the stacked body was relatively large (for example, 15 μm or 30 μm), decreases in the service capacities of the solid-state batteries of Comparative Examples 1 to 6 were suppressed only when the solid-state batteries were bound at a high binding pressure of about 5 MPa or 10 MPa. When the all-solid-state battery of Comparative Example 2 was bound at a binding pressure of 1.0 MPa, the service capacity was 85 with the result of Example 1 as "100". In the solid-state batteries of Examples 1 to 6, decreases in the service capacities were suppressed even when the solid-state batteries were bound at a low binding pressure (for example, bound under the atmospheric pressure via the film laminates).

More specifically, when the solid-state batteries of Comparative Examples 1 to 6 were bound under the atmospheric pressure (binding pressure: 0.08 MPa), the results show that the service capacities decreased significantly as the difference between the maximum value and the minimum value of the thickness of the stacked body increased. When the solid-state batteries of Examples 1 to 6 were bound under the atmospheric pressure, the service capacities were substantially maintained irrespective of the difference between the maximum value and the minimum value of the thickness of the stacked body.

As understood from the results in the cases where the difference between the maximum value and the minimum value of the thickness of the stacked body is 1 µm, 15 µm, and 30 µm, the effects of the present disclosure may be exerted remarkably when the difference is, for example, 10 µm or more.

In particular, in the solid-state batteries of Examples 1 to 3 in which the first current collector layer was coated with the conductive carbon on one side, discharging was carried out according to theoretical capacities without being affected by the difference between the maximum value and the minimum value of the thickness of the stacked body as compared to the solid-state batteries of Examples 4 to 6 in which the first current collector layer was not coated with the conductive carbon.

In the examples and the comparative examples described above, investigations were made into the all-solid-state battery in which the "first current collector layer" and the "first active substance layer" were the "positive current collector layer" and the "positive active substance layer", and the "second current collector layer" and the "second active substance layer" were the "negative current collector layer" and the "negative active substance layer". Similar effects may be attained even in a case of an all-solid-state battery in which the "first current collector layer" and the "first active substance layer" are a "negative current collector layer" and a "negative active substance layer" and the "second current collector layer" and the "second active substance layer" are a "positive current collector layer" and a "positive active substance layer".

What is claimed is:

1. An all-solid-state battery, comprising two or more stacked battery units having a monopolar structure, wherein
   each of the stacked battery units includes a first current collector layer, a first active substance layer, a first solid electrolyte layer, a second active substance layer, a second current collector layer, another second active substance layer, a second solid electrolyte layer, a third active substance layer, and a third current collector layer, which are stacked in this order,
   an adhesive is applied to the first current collector layer and the first active substance layer, the adhesive being provided between a surface of the first current collector layer and a surface of the first active substance layer in a stacking direction, the first current collector layer and the first active substance layer being provided adjacently to each other, and
   the first current collector layer and the first active substance layer that are stacked adjacently are bonded together with the adhesive;
   wherein the all-solid-state battery is bound at a binding pressure of 1.0 MPa or lower in a stacking direction of the stacked battery units;
   wherein an application amount of the adhesive is 0.1 uL/cm$^2$ or less with respect to an area of the first current collector layer or the first active substance layer,
   wherein the thickness of the adhesive is 5% or less of an electrode thickness of the all-solid-state battery;
   wherein the third current collector layer and a first current collector layer of an adjacent stacked battery unit are stacked adjacently, and the first current collector layer has a coating layer including conductive carbon and the adhesive on both sides of the first current collector layer, and the adhesive is provided between the third current collector layer and the first current collector layer of the adjacent stacked battery unit; and
   wherein in at least one of the two or more stacked battery units, a difference between a maximum value and a minimum value of a thickness of a set of layers of the stacked battery unit including the first active substance layer through the third active substance layer is 10 um or more at 16 measurement points determined symmetrically and evenly on the stacked body.

2. The all-solid-state battery according to claim 1, wherein the first current collector layer has the coating layer including conductive carbon and the adhesive on both sides of the first current collector layer.

3. The all-solid-state battery according to claim 1, wherein the all-solid-state battery is bound at a binding pressure of 0.7 MPa or lower in a stacking direction of the stacked battery units.

4. The all-solid-state battery according to claim 1, wherein the all-solid-state battery is bound at a binding pressure of 0.2 MPa or lower in a stacking direction of the stacked battery units.

5. The all-solid-state battery of claim 1, wherein a portion where the adhesive is applied is an L-shape at each corner of a portion of the first current collector layer to be stacked.

6. The all-solid-state battery of claim 1, wherein the difference is 100 um or less.

7. The all-solid-state battery of claim 1, wherein the difference is 80 um or less.

8. The all-solid-state battery of claim 1, wherein the difference is 50 um or less.

9. The all-solid-state battery of claim 1, wherein a proportion of the difference is 0.15% or more and 5.0% or less with respect to the maximum value of the stacked body.

10. An all-solid-state battery, comprising two or more stacked battery units having a monopolar structure, wherein
    each of the stacked battery units includes a first current collector layer, a first active substance layer, a first solid electrolyte layer, a second active substance layer, a second current collector layer, another second active substance layer, a second solid electrolyte layer, a third active substance layer, and a second current collector layer, which are stacked in this order,
    an adhesive is applied to the first current collector layer and the first active substance layer, and is provided between the first current collector layer and the first active substance layer which are adjacently provided each other, and
    the first current collector layer and the first active substance layer that are stacked adjacently are bonded together with the adhesive;
    wherein the all-solid-state battery is bound at a binding pressure of 1.0 MPa or lower in a stacking direction of the stacked battery units;

wherein the first current collector layer and a first current collector layer of an adjacent stacked battery unit are stacked adjacently, and the first current collector layer has a coating layer including conductive carbon and the adhesive on both sides of the first current collector layer; and wherein in at least one of the two or more stacked battery units, a difference between a maximum value and a minimum value of a thickness of a set of layers of the stacked battery unit including the first active substance layer through the third active substance layer is 10 um or more at 16 measurement points determined symmetrically and evenly on the stacked body.

11. The all-solid-state battery of claim 10, wherein the difference is 100 um or less.

12. The all-solid-state battery of claim 10, wherein a proportion of the difference is 0.15% or more and 5.0% or less with respect to the maximum value of the stacked body.

13. A method for manufacturing the all-solid-state battery of claim 10 including two or more stacked battery units having a monopolar structure, each of the stacked battery units including a first current collector layer, a first active substance layer, a solid electrolyte layer, a second active substance layer, a second current collector layer, a second active substance layer, a solid electrolyte layer, a first active substance layer, and a first current collector layer, which are stacked in this order, the method comprising:
(a) providing a stacked body excluding the first current collector layers from each of the stacked battery units;
(b) obtaining each of the stacked battery units by bonding the first current collector layers to respective end faces of the stacked body in its stacking direction with adhesives; and
(c) stacking the two or more stacked battery units together.

14. A method for manufacturing the all-solid-state battery of claim 1 including two or more stacked battery units having a monopolar structure, each of the stacked battery units including a first current collector layer, a first active substance layer, a solid electrolyte layer, a second active substance layer, a second current collector layer, a second active substance layer, a solid electrolyte layer, a first active substance layer, and a first current collector layer, which are stacked in this order, the method comprising:
(a) providing a stacked body excluding the first current collector layers from each of the stacked battery units;
(b) obtaining each of the stacked battery units by bonding the first current collector layers to respective end faces of the stacked body in its stacking direction with adhesives; and
(c) stacking the two or more stacked battery units together.

15. The method according to claim 14, further comprising binding the all-solid-state battery at a binding pressure of 1.0 MPa or lower in a stacking direction of the stacked battery units.

16. The method according to claim 14, wherein conductive carbon is coated on one side of the first current collector layer or both sides of the first current collector layer.

17. The method according to claim 14, wherein, in at least one of the two or more stacked battery units, a difference between a maximum value and a minimum value of a thickness of the stacked body is 10 µm or more.

* * * * *